E. T. VANGEZELL.
CAROUSEL.
APPLICATION FILED AUG. 21, 1908.
925,402.
Patented June 15, 1909.
2 SHEETS—SHEET 2.
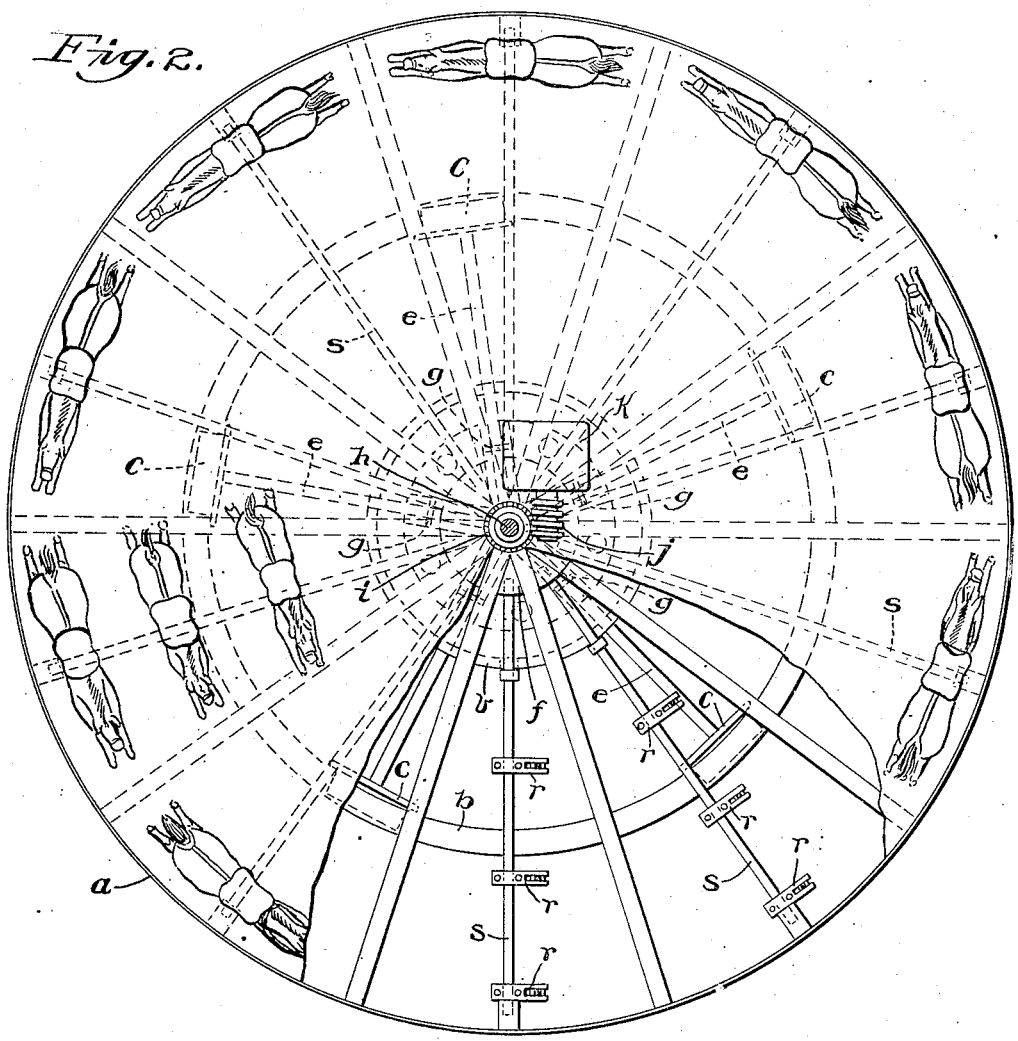
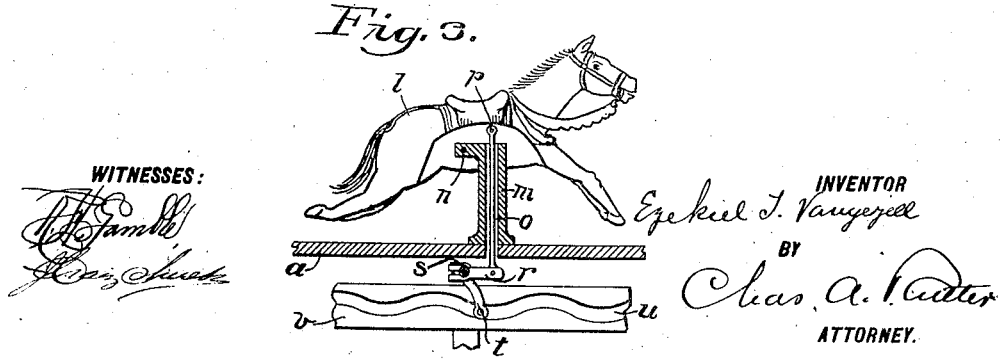
WITNESSES:
INVENTOR
Ezekiel T. Vangezell
BY
Chas. A. Cutter
ATTORNEY.

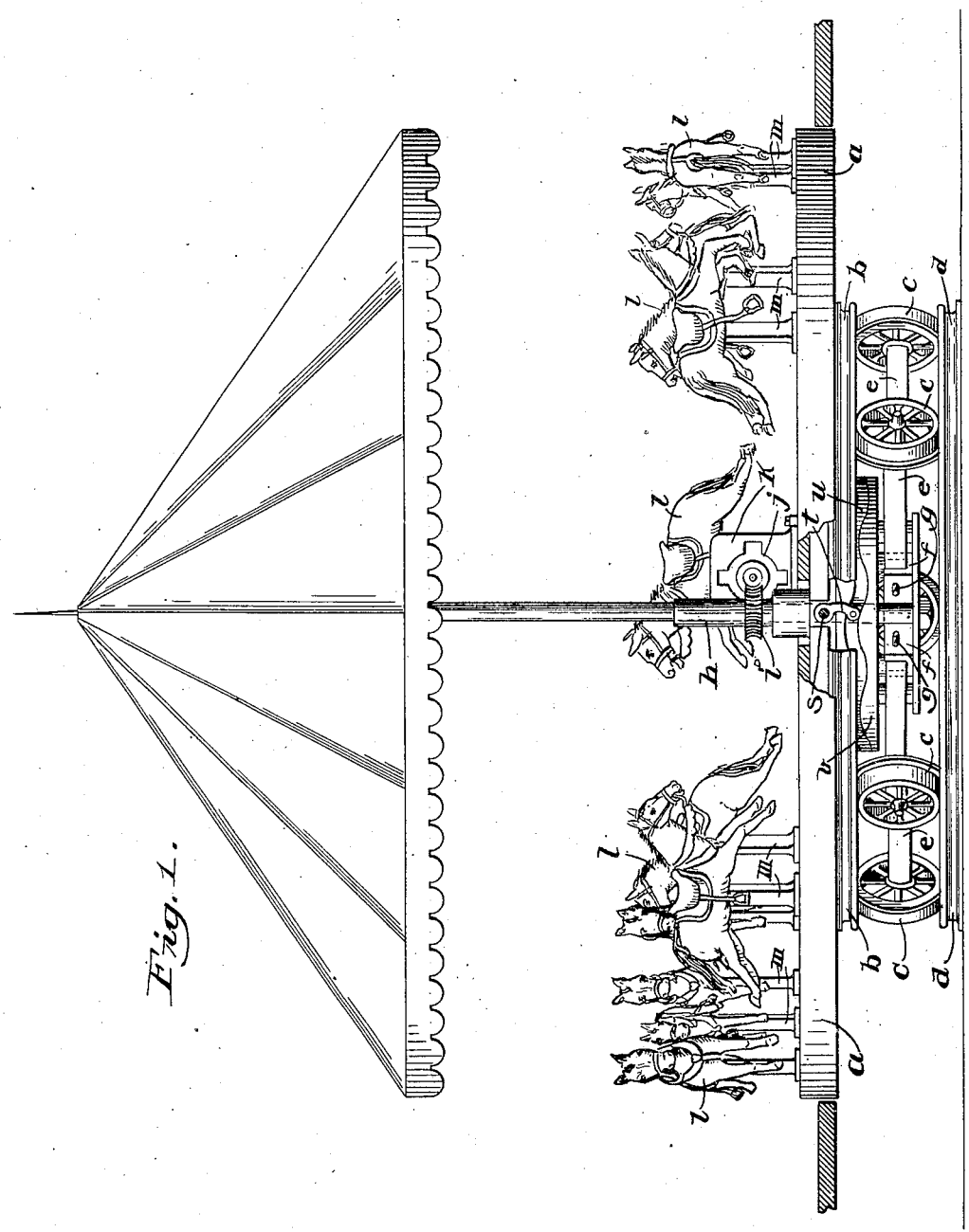

UNITED STATES PATENT OFFICE.

EZEKIEL T. VANGEZELL, OF CAMDEN, NEW JERSEY.

CAROUSEL.

No. 925,402.

Specification of Letters Patent. Patented June 15, 1909.

Application filed August 21, 1908. Serial No. 449,600.

*To all whom it may concern:*

Be it known that I, EZEKIEL T. VANGEZELL, a citizen of the United States, and a resident of the city and county of Camden, State of New Jersey, have invented certain new and useful Improvements in Carousels, of which the following is a specification.

My invention relates to improvements in carousels and the objects of my invention are to furnish an improved means for carrying and an improved means for driving the rotating platform which carries the simulated animals which are ridden by the occupants; to furnish an improved means for supporting said animals; to furnish an improved means for giving to said animals a motion independent of and in addition to the movement of the carrying platform, and to furnish certain other improvements which will be described hereinafter.

In the accompanying drawings forming part of this specification, and in which similar letters of reference indicate similar parts throughout the several views:—Figure 1, is a side elevation, partly in section, of my improved carousel; Fig. 2, a plan of Fig. 1; Fig. 3, a side elevation of one of the animals showing, in section, the supporting standard and, in side elevation, the means for giving a movement to said animal independent of the rotary movement of the carrying platform.

$a$ is the rotary platform of the carousel.

Secured to the under side of the platform $a$, and preferably concentric with it, is a circular track $b$ which is carried by wheels $c$ which are carried by a second circular track $d$ which is carried by the ground. The wheels $c$ form roller bearings for carrying the moving parts of the carousel and in order that they may at all times maintain their proper relative positions they are furnished with shafts or axles $e$ the inner ends of which are each separately pivoted at $g$ to a plate $f$ which is carried by a central shaft $h$ which is itself rotatably carried by the platform $a$, the shafts being pivoted at their inner ends to permit the wheels to move vertically in case of any inequalities in the tracks. The shaft $h$ is furnished with a worm wheel $i$, best shown in Fig. 1, which gears with a worm $j$ which is driven by a suitable motor $k$ carried by platform $a$. The motor $k$ drives the worm $j$ which drives worm wheel $i$ and shaft $h$ which, through shafts or axles $e$, drives the wheels or rollers $c$ upon the tops of which the circular track $b$ rests, hence the motion of the wheels $c$ is imparted to track $b$ and to platform $a$ which latter revolves approximately twice as fast as the wheels move over the tracks.

I do not desire to confine myself to any particular driving means as it will be evident that any suitable apparatus for this purpose may be employed.

The animals $l$ are pivoted to a hollow support $m$, Fig. 3, at $n$.

$o$, is a rod passing through support $m$ at its upper end pivoted to the animal at $p$ and at its lower end to the outer end of a crank $r$ which is carried by a radial shaft $s$.

$t$ is a crank carried near the inner ends of shafts $s$ the lower end of which engages with a cam slot $u$ framed in the periphery of a disk $v$ which is suitably carried by plate $f$. As the platform $a$ revolves the crank $t$ is dragged around through the cam slot $u$ which imparts to this crank a reciprocating motion which motion is imparted to the shaft $s$ and the cranks $r$ carried thereby; from the cranks $r$ this motion is given to rods $o$ which rocks the animals, which are pivotally supported at $n$ as before described, to rock with a motion closely resembling a gallop.

The device may be equipped with any number of shafts $s$, in the drawings, see Fig. 2, ten shafts $s$ are shown and each of these shafts is shown actuating three animals placed abreast. Of course the number of animals operated by one shaft may be increased or diminished as wanted or as dictated by the diameter of the platform $a$. It will be observed that the platform $a$ and the animals are supported from beneath and that there are no rods or stays above the platform necessary.

Having thus described my invention I claim as new and desire to secure by Letters Patent:—

1. In a carousel, in combination, a rotating platform, a circular track carried by the underside of said platform, a shaft passing through but not engaging said platform, arms or axles carried by said shaft, wheels carried by said axles and carrying said circular track, a circular track carried by the ground carrying said wheels, and means for rotating said platform.

2. In a carousel, in combination, a rotating platform, a circular track carried by the underside of said platform, a shaft passing freely through said platform, arms or axles carried by said shaft, wheels carried by said arms upon the tops of which said track is carried, a second circular track carrying said wheels, and means carried by said platform for rotating said shaft and connected parts.

3. In a carousel, in combination, a rotating platform, means for carrying and means for rotating said platform, a support carried by said platform, a simulated animal pivoted to said support, a shaft carried by said platform, a crank carried by said shaft, a rod one end of which is pivotally secured to the outer end of said shaft and to said animal, a second crank secured to said shaft, a cam adapted to engage said latter crank to rock said shaft during the rotation of said platform.

4. In a carousel, in combination, a rotating platform, two circular tracks one carried by said platform and the other by the ground, wheels resting upon said latter and carrying said former track, a shaft passing through and turning freely in said platform, a disk having a cam slot formed circumferentially in its periphery, arms carried by said shaft upon which said wheels turn, hollow standards carried by said platform, simulated animals pivoted to said standards, rods carried radially by said platform, cranks carried by said arms, rods passing through said hollow standards and pivoted to said cranks and to said animals, cranks carried by said rods engaging the cam slot in said disk, and means for rotating said platform.

EZEKIEL T. VANGEZELL.

Witnesses:
SAML. J. T. WARE,
CHAS. M. BALDWIN.